United States Patent [19]
Mysicka et al.

[11] 3,831,002
[45] Aug. 20, 1974

[54] FRYPAN WITH REMOVABLE HANDLES AND HEAT SHIELD

[75] Inventors: James C. Mysicka, Berwyn; William L. Lockett, Downers Grove, both of Ill.

[73] Assignee: Sunbeam Corporation, Chicago, Ill.

[22] Filed: May 21, 1973

[21] Appl. No.: 362,041

[52] U.S. Cl.............. 219/432, 99/425, 126/390, 219/433, 219/436, 219/439, 220/64
[51] Int. Cl........................................... F27d 11/02
[58] Field of Search .......... 219/429, 430, 432, 433, 219/436, 437, 438, 439, 461; 99/425; 220/64; 126/390

[56] References Cited
UNITED STATES PATENTS

| | | | |
|---|---|---|---|
| 1,006,104 | 10/1911 | Kuhn et al. | 219/433 |
| 1,694,570 | 12/1928 | Watts | 219/433 |
| 2,687,469 | 8/1954 | Koci | 219/433 X |
| 2,785,277 | 3/1957 | Jepson | 219/438 X |
| 2,826,670 | 11/1958 | Keefe, Jr. | 219/438 X |
| 2,850,616 | 9/1958 | Hatch | 219/433 |
| 2,880,301 | 3/1959 | Naxon | 219/436 |
| 3,008,601 | 11/1961 | Cahne | 220/64 |
| 3,141,090 | 7/1964 | Batcher | 219/438 |
| 3,215,063 | 11/1965 | Olson et al. | 99/425 |
| 3,271,653 | 9/1966 | Wolf | 220/64 |
| 3,384,195 | 5/1968 | Jepson et al. | 219/442 |
| 3,395,266 | 7/1968 | Price | 219/433 |
| 3,593,702 | 7/1971 | Zigomalas | 126/390 |
| 3,681,568 | 8/1972 | Schaefer | 219/432 |

*Primary Examiner*—Volodymyr Y. Mayewsky
*Attorney, Agent, or Firm*—George R. Clark; Neil M. Rose; John S. Pacocha

[57] ABSTRACT

An electric frying pan having handles and a shield for the bottom surface of the frypan detachably secured to the vessel portion of the frypan. In one embodiment the handles and shield are detachable as a unitary assembly. An alternative embodiment provides for the detachment of the shield and handles separately.

14 Claims, 10 Drawing Figures

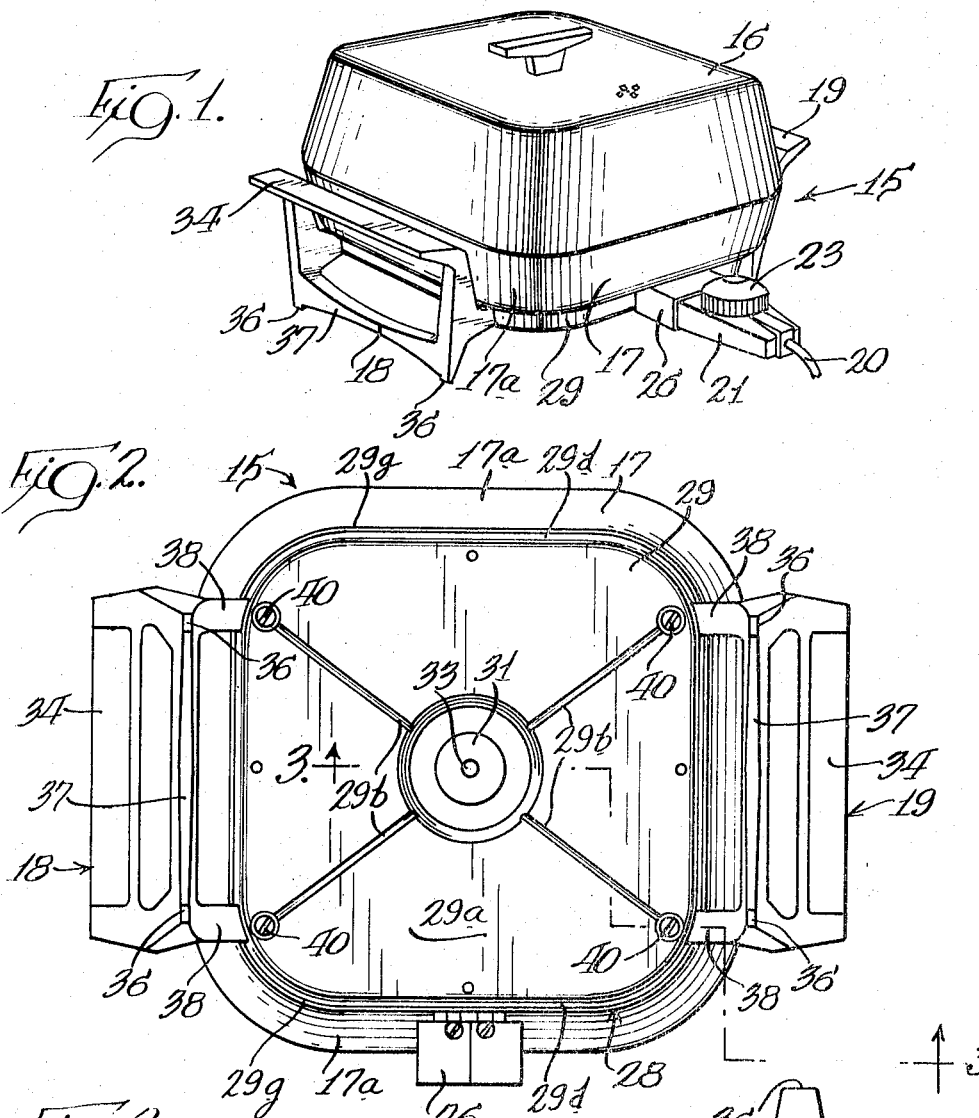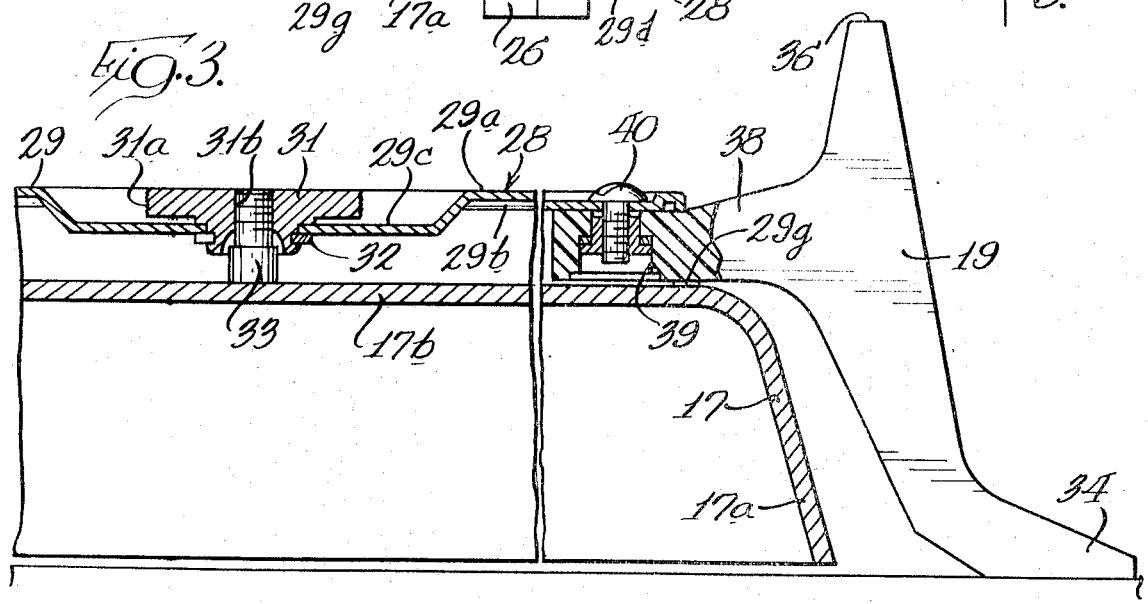

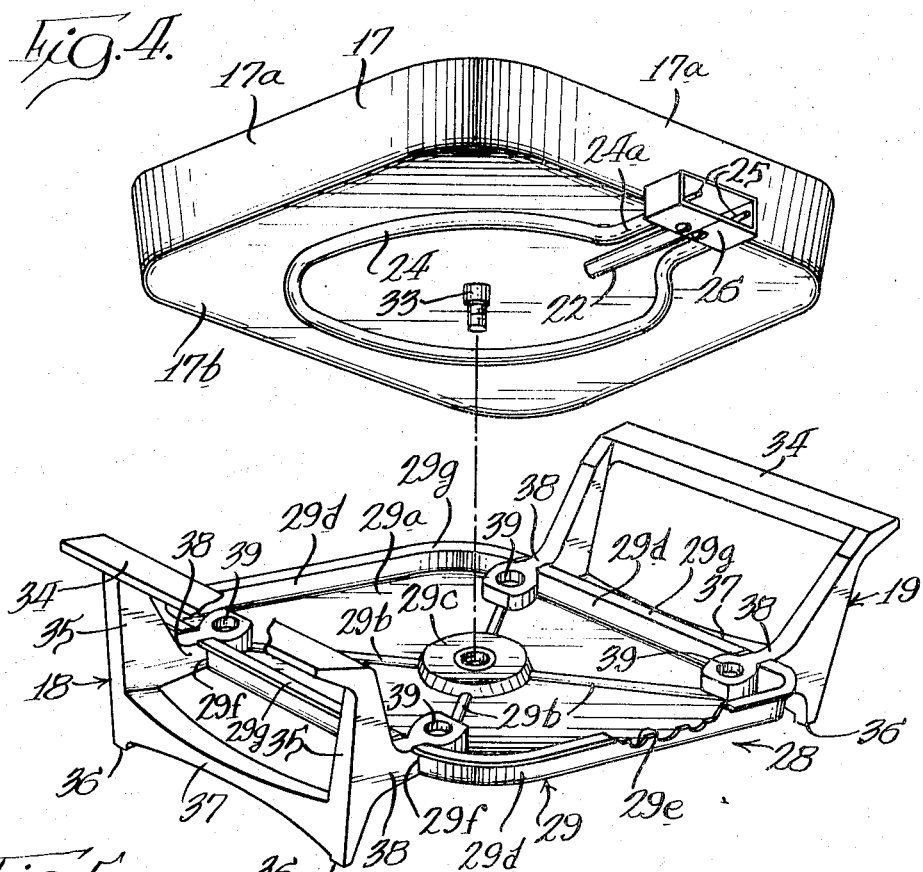
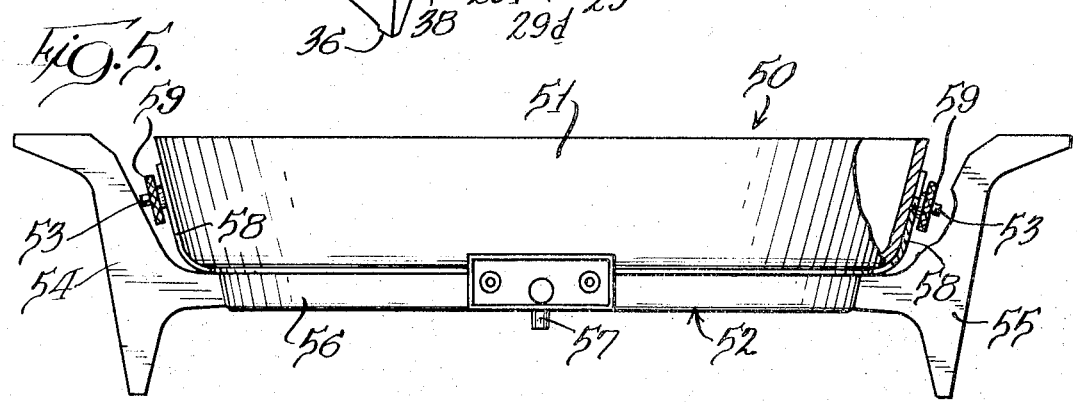
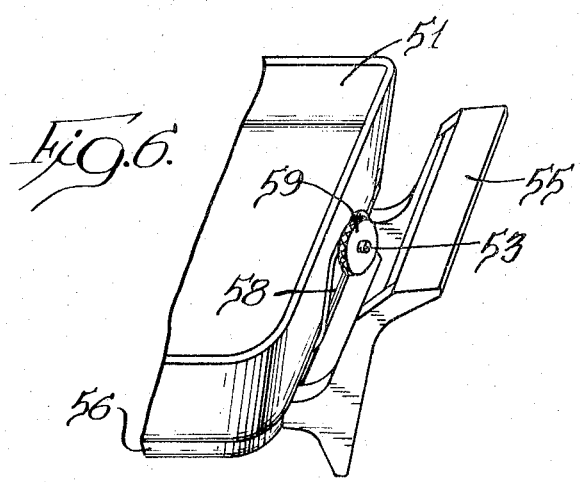

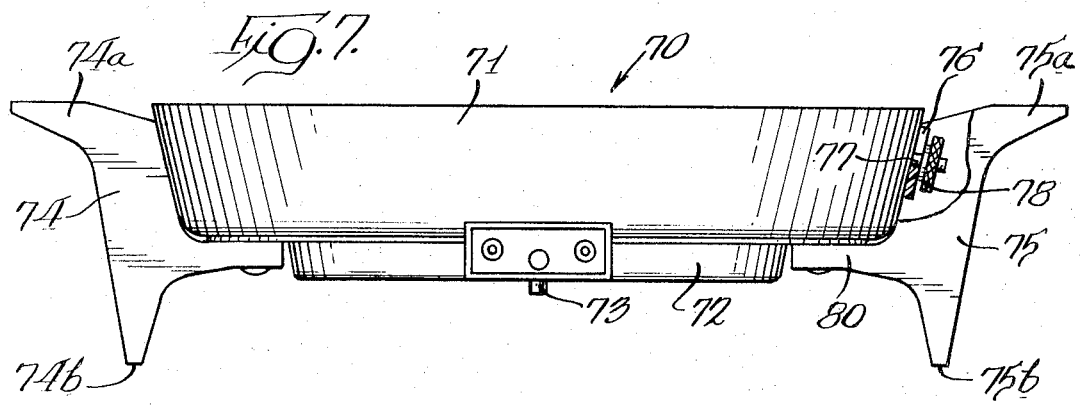
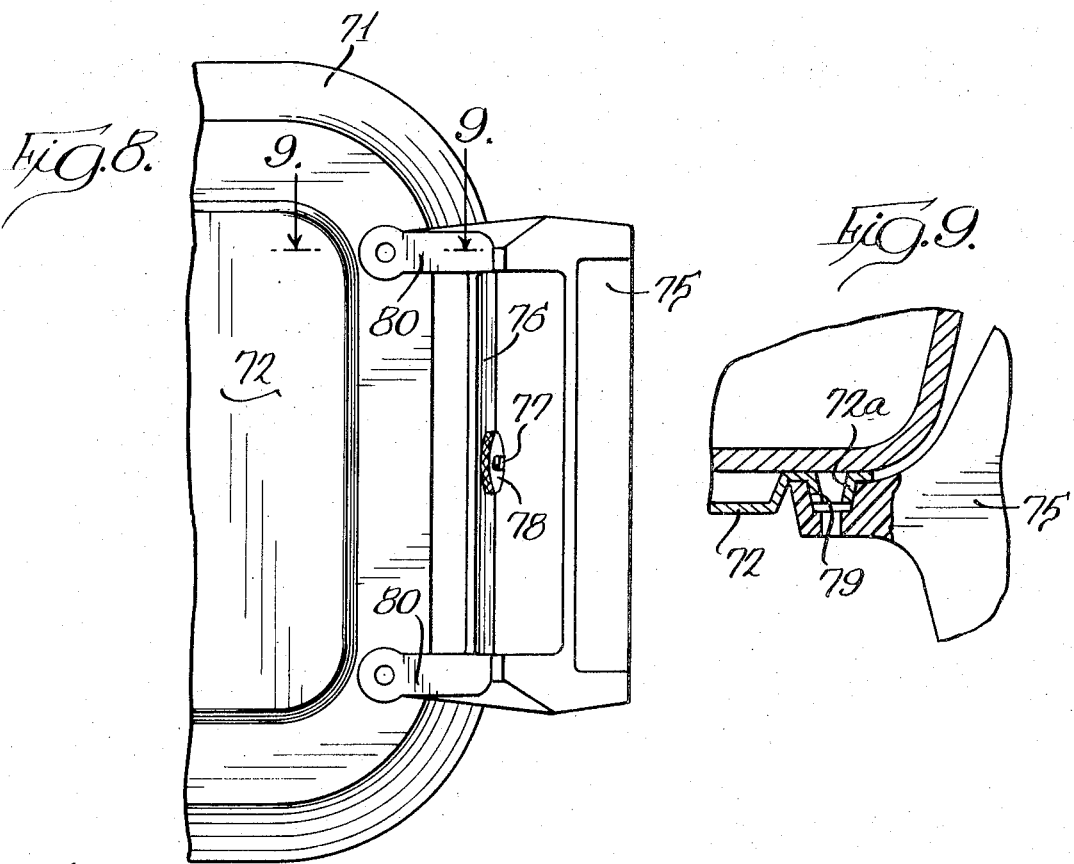
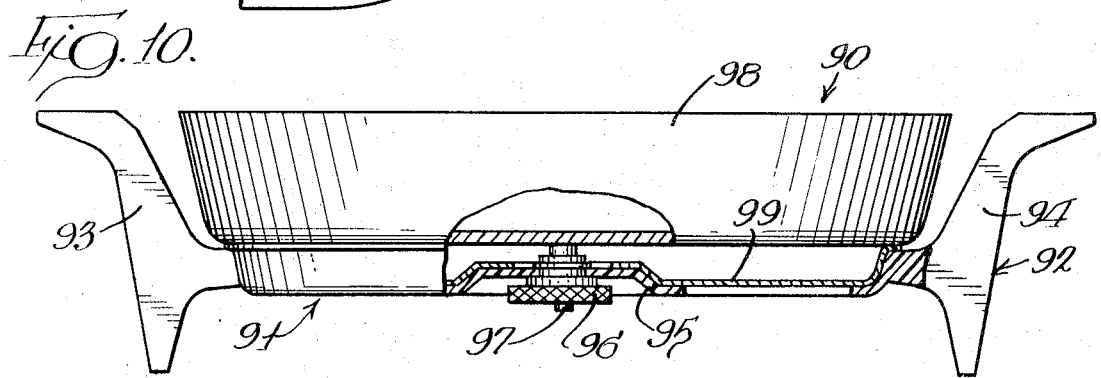

FRYPAN WITH REMOVABLE HANDLES AND HEAT SHIELD

BACKGROUND OF THE INVENTION

The thermostatically controlled electric frying pan or frypan has become one of the most popular household cooking appliances in the less than twenty years since it was introduced on the market. One of the major advantages of the modern electric frypan is that it may be cleaned by immersing the entire frypan in water. This immersibility has been made possible by sealing the sheathed heating element at the point where the electric terminal elements extend from the sheath to prevent moisture from entering the interior of the sheathed heating element where it would short out the element. In addition, means have been provided to permit detachment of the thermostatic control means so that the control will not be damaged when the frypan is immersed for cleaning purposes.

The thermostatic control for the frypan conventionally takes the form of a probe control which has a temperature sensing probe insertable into a recess or a passageway formed on the bottom of the frypan. The probe control also includes a power cord for supplying power to the frypan and female terminal connectors which cooperate with the terminals on the sheathed heating element. The control functions to cycle the power to the heating element to achieve a desired temperature in the frypan. The frypan vessel portion is conventionally made of either a cast or stamped aluminum alloy. The sheathed heating element for the frypan is cast integrally with the pan in the case of a cast pan or brazed to the pan in the case of a stamped pan. The means forming the passageway to receive the probe on the thermostat control is either a recess in the case of the cast pan or a cylindrical, tubular member brazed to the bottom in the case of the stamped pan.

In order to support the frypan with its heating element on the bottom in spaced relationship to a supporting surface and to permit the pan to be transported from place to place, there are conventionally provided plastic legs and handles for the frypan. In some instances, the legs and handles are integrated together in the form of moulded plastic parts which are secured to opposite edges of the frypan. Because of the immersibility of the frying pan, it is relatively easy to place the frying pan in dishwater to scrub the inside and the bottom of the frypan. With the plastic handles and feet secured to the frypan, the entire appliance is so bulky that it is difficult to fit the appliance in a dishwasher. Experience has revealed, however, that it is difficult to clean the bottom surface of the frypan in spite of the feasibility of immersing the frypan in the water. This problem is caused by the high temperature and the unfinished surface on the bottom of the frypan. It has been found that the grease and oils normally associated with cooking in a frypan tend to become deposited on the bottom of the frypan and with the high temperatures on the order of 400 – 500° F. on the bottom of the frypan, particularly the heating element surface, these grease and oil deposits become hard and extremely difficult to remove.

Although there have been frypan finishes which would facilitate cleaning the bottom surface of the frypan, these alternative finishes present other difficulties which make them unacceptable for this application. Most available paints for such a surface would deteriorate quickly as a consequence of the heat and abrasive material used to clean such cooking utensils. In addition, it has been determined that when porcelain enamel finishes, which can stand the heat and abrasion, are applied to the bottom of the frypan, the radiation of the heat from the frypan bottom to the supporting surface increases considerably. With the normal legs or supporting means used in connection with an electric frypan, the bottom surface of the pan is approximately 1 ¾ inches from the supporting surface. Any significant change in the radiation characteristics of the frypan bottom results in an excessive amount of heat radiation to the supporting surface. As a consequence of this problem, manufacturers have found it necessary to more or less ignore the difficulties involved in cleaning the bottom of the frypan and have left the bottom surface of the frypan uncoated so as to minimize the radiation therefrom.

There have been examples in the prior art of frypans provided with removable handles, one example being shown in Cook U.S. Pat. No. 3,685,092. The removal of the handles is desirable since it permits the frypan to be fitted into a dishwasher for washing purposes and also makes the frypan less bulky so that it may be handled more easily if it is washed in a sink or dishpan.

Since the business of the manufacturing and selling electric frypans is extremely competitive, any features or improvements must add little to the cost of the frypan or they will be considered unacceptable from a competitive standpoint. Although housewives may consider the detachability of the handles and feet as a useful feature, they are not prepared to pay any appreciable increase in price for a frypan having this feature. Accordingly, it would be desirable to provide an inexpensive electric frypan having removable handles and feet to permit easy cleaning whether in the automatic dishwasher or by conventional means and having a shielded porcelain enamel bottom surface for easy cleaning.

There are prior art patents showing frypans or cooking vessels having detachable trivet-like supporting portions which should be considered in analyzing Applicants' advance in the art. The patent to Price U.S. Pat. No. 3,395,266 and Hatch U.S. Pat. No. 2,850,616 disclose cooking vessels which are separable from the portion which includes the feet and the heating element. The approach as exemplified by the Hatch and Price patents permits easy cleaning of the cooking vessel itself but provides complicated structures which are less satisfactory from a functional standpoint and bear little similarity to the invention disclosed herein. Also of interest is Naxon U.S. Pat. No. 2,798,931 and Kune et al U.S. Pat. No. 1,006,104, both of which disclose cooking vessels detachable from the heating elements and supporting means so that they may be immersed for cleaning purposes.

DESCRIPTION OF THE INVENTION

The present invention involves an electric frypan which is provided with a detachable cradle having handles and feet associated therewith. The cradle, itself, serves as a cover or shield for the bottom of the frypan and permits the use of a porcelain enamel coating for the bottom of the frypan in spite of the increased heat radiation which results from such a coating. The cradle shields the supporting surface from the radiation which might otherwise cause excessive temperature conditions at the supporting surface. With the plastic feet and handles removed from the frypan along with the cradle, the vessel portion of the frypan may be easily fitted into an electric dishwasher for very thorough cleaning and with the porcelain enamel bottom surface, the grease accumulated thereon is easily removed.

The frypan is supported by a pair of combined feet and handle members, each having two spaced surface engaging portions and an elongated handle portion which is spaced from the side wall of the frypan and extends parallel thereto. These feet and handle members are secured to the cradle and are detachable from the vessel portion of the frypan along with the cradle. The cradle, itself, is readily removable from the vessel portion by means of a large knurled nut which is exposed at the underside of the cradle and which may be engaged or disengaged from a threaded stud extending from the bottom of the frypan through the cradle. The cradle, the combined feet and handle members, and the assembly nut are attached together as a unitary assembly so as to facilitate handling by the housewife.

In an alternative embodiment of the invention, the shield for the bottom of the frypan may be separate from the remainder of the cradle or in a further embodiment, the handles may be separately detachable from the shield.

It is an object of the present invention to provide an improved frypan having combined feet and handle members and a shield for the bottom of the frypan detachably connected to the vessel portion of a frypan.

It is another object of the present invention to provide an electric frypan having a detachable cradle which receives and supports the vessel portion of a frypan, which vessel portion is provided with easily cleaned high heat radiation surfaces on the bottom thereof.

It is another object of the present invention to provide an electric frypan having a vessel portion which is supported on a detachable cradle which shields the bottom of the frypan and acts as a support for the handles and feet of the frypan.

It is a further object of the present invention to provide an improved frypan having a detachable cradle with handles and feet associated therewith which is secured to the bottom surface of the frypan by means of a manually operable nut or assembly means.

Other objects and advantages of the present invention will be apparent to those skilled in the art from the following specification including the drawings and the claims.

DESCRIPTION OF THE DRAWINGS

FIG. 1 is a perspective view of a preferred embodiment of an electric frypan embodying the present invention;

FIG. 2 is a bottom view of the frypan of FIG. 1;

FIG. 3 is an enlarged fragmentary sectional view taken on line 3—3 of FIG. 2;

FIG. 4 is an exploded perspective view of the frypan of FIG. 1 to 3 showing the vessel portion disassembled from the cradle portion;

FIG. 5 is a side elevational view of an alternative embodiment of a frypan embodying the present invention with a portion of the handle cut away to expose the assembly means;

FIG. 6 is a fragmentary perspective view of the means for retaining the elements of the frypan of FIG. 5 in assembled relation;

FIG. 7 is a side elevational view of another alternative embodiment of the present invention with a portion of the handle cut away to expose the assembly means;

FIG. 8 is a bottom view of the frypan of FIG. 7;

FIG. 9 is an enlarged fragmentary sectional view taken on line 9—9 of FIG. 8; and FIG. 10 is a side elevational view of another alternative embodiment of the present invention with portions cut away for illustrative purposes.

Referring to the drawings, there is shown in FIG. 1 a frypan designated generally by reference numeral 15. The frypan 15 includes a cover 16, a vessel 17 and combined handle and leg members 18 and 19. In order to supply power to the frypan 15 and to regulate the temperature thereof, there is provided a power cord 20 having a control 21 which is of the conventional probe variety having an elongated temperature probe which extends into a passageway or tubular member 22 on the bottom of the vessel as best shown in FIG. 4. The probe control 21 includes a manually rotatable knob 23 which is adjustable to obtain the desired cooking temperature in the frypan.

Referring again to FIG. 4, it is noted that the vessel 17 of the frypan 15 is a shallow, generally square vessel having side walls 17a and a bottom wall 17b. The vessel 17 is made of an aluminum alloy and is either stamped or cast. Secured to the bottom 17b of the vessel 17 by brazing is a sheathed heating element 24 which is generally circular in configuration, having two sidewardly extending legs 24a. The heating element 24 is of a conventional sheathed element construction having a metal tubular sheath within which is enclosed a helically formed resistance wire element which is supported in spaced relation to the sheath by compacted magnesium oxide. As is well known, the magnesium oxide provides electrical insulation while permitting heat conduction from the resistance wire to the sheath and the vessel 17. Connected to the end of the resistance wires are terminal members 25 which extend outwardly from the legs 24a of the sheathed heating element 24. These terminal members 25 are provided with insulating water seals which are received in the ends of the legs 24a to prevent water from entering the sheath and shorting out the resistance wire therein. The terminal members 25 are spaced on either side of the tubular member 22 to permit inter-engagement between cooperating female terminals on the probe control 21. The temperature probe on the control 21 extends into the tubular member 22 when the power connection is made to the terminal members 25. A suitable terminal housing 26 is secured to the bottom of the vessel 17 enclosing the terminal members 25 as shown in FIG. 4.

The vessel 17 along with its probe control 21 described above is completely conventional. In finishing a frypan vessel, it is conventional to coat the interior of the vessel with a material which will lessen the tendency of the food to stick to the surface during or after cooking. The outer surface of the vessel 17 is either polished or painted. Experience has revealed that the polished or unfinished aluminum surface of the frypan vessel has a low coefficient of heat radiation. If, however, the outer surface is coated with a decorative material such as porcelain enamel to facilitate the cleaning of the frypan, there will be a great increase in the coefficient of heat radiation. Accordingly, it has been conventional to coat or paint only the sidewalls 17a and not the bottom 17b of frypans of this type. During many cooking operations, there is a tendency for grease to run down the sidewalls 17a of the frypan and because of the radiused corners, to run down to the bottom 17b and collect at the surface of heating element 24. Because of the high temperatures existing on the surface of the frypan vessel 17, often in the area of 400–500° F., the grease which flows on to these surface areas tends to harden quickly so that it is extremely difficult to remove by conventional cleaning procedures. This problem is increased by the fact that the grease has a tendency to adhere to the uncoated aluminum bottom surface and is very difficult to remove from the surface without damaging the surface.

In order to permit the frypan vessel 17 to be coated with a decorative and easily cleaned coating such as porcelain enamel, the frypan 15 is provided with a supporting trivet or cradle 28 to which the combined handle and leg members 18 and 19 are secured. The cradle 28 is formed by stamped steel pan or shield 29 which fits against the bottom wall 17b of the vessel 17 covering the heating element 24 and most of the bottom as is illutrated by FIG. 2. The pan 29 includes a substantially flat center portion 29a having diagonally extending ribs 29b for strengthening and reinforcing purposes and a raised center portion 29c as is best illustrated in FIGS. 3 and 4. It should be noted, however, that the raised center portion in FIG. 3 appears as a depressed portion 29c since the frypan in that view is inverted.

Recessed within the depression formed by the portion 29c, as seen in FIG. 3, is an assembly nut 31 which has a knurled outer periphery 31a and a threaded central opening 31b. In lieu of knurling, the nut 31 could be alternatively formed with any irregular shape so that it could be rotated easily by hand without the need of a wrench or other tool. The assembly nut 31 is retained in an opening in the center of the pan 29 by means of a C-ring 32 which is received in an annular groove on the assembly nut 31 as is illustrated in FIG. 3. The C-ring 32 is spaced sufficiently far from the shoulder on the opposite side of the pan 29 that the nut 31 is loosely retained on the pan 29 so that it may be readily rotated into threaded engagement with a stud 33 which extends from the center of the frypan bottom 17b as shown best in FIGS. 3 and 4. Thus, rotation of the nut 31 permits the user of the frypan 15 to quickly and easily assemble or disassemble the vessel 17 from the cradle or trivet 28.

The pan 29 is formed with sidewalls 29d which extend upwardly from the bottom wall 29a as shown in FIG. 4. The sidewalls 29d are formed with a cutout 29e which is adapted to receive and provide clearance for the legs 24a of the heating element 24 and the tubular member 22. In addition, there are four openings 29f provided, through which the portions of the combined handle and leg members 18 and 19 extend as shown in FIG. 4. At the uppermost edge of the sidewalls 29d as shown in FIG. 4, there are provided outwardly extending flanges 29g which in the assembled position of pan 29 engage the bottom of vessel 17.

Each of the combined handle and leg members includes a flat elongated handle 34 which is positioned in spaced relationship to the sidewalls 17a of the frypan vessel 17. Extending downwardly from either end of each handle 34 are column members 35 which terminate in supporting feet 36. The lower ends of the columns 35 are interconnected by a bar 37 which extends substantially parallel to the handle 34.

For the purpose of supporting the combined handle and leg members 18 and 19 with respect to the vessel 17, there are provided inwardly extending support portions 38 which project from the columns 35 and extend through cutout openings 29f formed in the pan sidewalls 29d. The supporting portions 38 are formed at their inner ends with openings 39 through which bolts 40 extend to assemble the combined handle and leg members 18 and 19 to the pan 29. As is shown in FIG. 3, the nuts received on the inner ends of bolts 40 are recessed within the support portions 38. In their assembled positions, the members 18 and 19 are spaced about one sixty-fourth inch from the vessel portion 17 to prevent deterioration of the plastic from the heat of vessel portion 17.

When the cradle or trivet 28 is assembled to the bottom of the vessel 17 by threading the knurled assembly nut 31 onto the stud 33, the pan or shield 29 is drawn into engagement with the sidewalls 29d engaging the bottom wall 17b of the vessel 17. The heating element 24 and most of the bottom area of the frypan vessel is enclosed or shielded by the pan 29, thus, limiting the radiation from the element 24 and the bottom 17b to the supporting surface. This shielding permits the bottom of the vessel 17 to be coated with a porcelain enamel which increases the radiation considerably, but which facilitates the cleaning of grease and other deposits of food therefrom. In addition, by having the combined handle and leg members 18 and 19 removable along with the shield 29, the vessel portion 17 is made as convenient as possible to insert into an automatic dishwasher for cleaning purposes.

In connection with the assembly of the cradle or trivet 28 to the vessel portion 17, it should be understood that the vessel and trivet may be positioned in an inverted position as shown in FIG. 3. As the nut 31 is threaded into engagement with the stud 33, the vessel 17 is lifted off the supporting surface and the entire assembly is supported by the handles 34 as illustrated in FIG. 3. This arrangement of the handles simplifies the assembly of the trivet to the pan since the user is not required to perform any complicated aligning of the parts to be assembled.

Referring now to FIGS. 5 through 10, there are shown additional embodiments of the invention. In the embodiments of FIGS. 5 and 6, the frypan is shown having a cradle assembly 50 which includes a vessel 51 and a cradle or trivet 52. The vessel 51 and cradle 52 are similar in construction to the vessel 17 and the cradle 28 except insofar as the manner in which they are assembled together. The vessel 51 is fabricated with a pair of threaded assembly studs 53 which extend outwardly from opposite sides of the vessel portion 51 as shown in FIG. 5. The combined handle and leg members 54 and 55 are identical to the corresponding members 18 and 19 disclosed in connection with the preferred embodiment. The combined handle and leg members are secured to a sheet metal pan or shield 56 which has a centrally disposed opening through which a non-threaded stud 57 on the bottom of the frypan extends. The pan or shield 56 is similar in shape to the pan 29 of the preferred embodiment but includes formed assembly tabs 58 which are formed with slots to receive the studs 53. Received on the studs 53 are knurled nuts 59 which may be threaded into engagement with the assembly tab 58 to clamp the tabs 58 against the sidewalls of the vessel 51, thereby securing the cradle 52 to the vessel 51. Although the assembly means of the embodiment of FIGS. 5 and 6 is somewhat more complicated than the embodiment of FIGS. 1 through 4, it has the advantage that the knurled nuts 59 may be easily seen and manipulated while the vessel 51 and the cradle 52 are in an upright position. In both instances, however, the cradles are completely removable to permit easy cleaning of the vessel separated from the shield and combined handle and leg members. In addition, the shield 56 of the embodiment of FIGS. 5 and 6 serves to limit the radiation from the porcelain enamel bottom of the vessel toward the supporting surface.

The embodiment of FIGS. 7 to 9 differs from the earlier described embodiments in that the shield and the combined handle and leg members are readily separable from each other upon detachment from the frypan vessel. As shown in FIGS. 7, 8 and 9, a frypan 70 is formed with a vessel 71 and a pan or shield 72. The shield 72 underlies the bottom surface of the frypan in the same manner as the pan 29 of the first embodiment or the pan 56 of the second embodiment. The pan 72 is formed with a centrally disposed opening which is received on a non-threaded locating stud 73 carried by the bottom of the vessel 71 and extending through the pan 72. The frypan 70 includes combined handle and leg members 74, 75 which are similar in shape to the combined handle and leg members 18 and 19 having handles 74a and 75a and feet 74b and 75b. In addition, each of the combined handles and leg members has a transversely extending bar 76 which is provided with an opening for receiving a stud 77 which extends laterally from the side of the vessel 71. Rotatably supported on the outer surface of bar 76 in alignment with the hole for receiving the threaded stud 77 is a knurled nut 78 which may be supported in the same manner as the knurled nut 31 is supported with respect to the shield 29. The knurled nuts 78, one of which is shown in FIG. 7, serve to retain the combined handle and leg members 74 and 75 to the vessel 71. The members 74 and 75 also serve to retain the shield 72 in position agaisnt the bottom of the vessel 71 as is shown in FIGS. 7 and 9. The shield 72 is formed with upstanding bosses 72a which are received within downwardly facing recesses 79 formed in the support portions 80 of the combined handle and leg portions 74 and 75. The support portions 80 clamp downwardly to retain the shield 72 in engagement with the bottom of the vessel 71. Upon detachment of the members 74 and 75 by unscrewing the knurled nuts 78, the shield 72 is no longer secured to the vessel 71. Although the embodiment of FIGS. 7 to 9 is somewhat more complicated than the earlier described embodiment as a consequence of its inculding three separate parts, it provides separable parts which are more easily handled than a cradle or trivet 28. It should be appreciated, however, that the shield 72 would perform the same function in shielding the supporting surface from radiation when the bottom of the frypan vessel 71 is coated with a porcelain enamel coating.

There is shown in FIG. 10 a third alternative embodiment comprising a frypan 90 having a cradle or trivet 91 which serves substantially the same purpose as the cradle or trivet 28 disclosed in connection with the first embodiment. The frypan 90 is provided with a one-piece plastic supporting member 92 which includes combined handle and leg members 93 and 94 which are interconnected by a molded plastic spiderlike structure 95. The spiderlike structure 95 includes integrally molded bars, two of which are parallel and connect the opposed ends of members 93 and 94 together and two of which form an X crossing at the center with the free ends connected to the ends of the parallel bars. The center of the X portion of the spiderlike structure 95 supports the knurled nut 96 which threads into engagement with a threaded stud 97 extending downwardly from the bottom of the vessel 98. Clamped between the plastic spider 95 and the bottom of the vessel 98 is a metal pan or shield 99.

While several embodiments of the invention have been shown, it will, of course, be understood that the invention is not limited thereto since many modifications may be made. It is contemplated that the appended claims will cover any such modifications as fall within the true spirit and scope of the invention.

What we claim is:

1. An immersible electric frying pan comprising a vessel of heat conducting material having side walls and a bottom wall with a sheathed electric heating element supported on said bottom wall in good heat conducting relationship with said bottom wall, a radiation shield readily detachably connected to said vessel and positioned below said bottom wall to shield radiation from said bottom wall to a supporting surface, combined handle and feet members on opposite sides of said vessel and engaging opposite edges of said shield, said combined handle and feet members being formed of heat insulating material, manually operable assembly means for retaining said shield and said members secured to said vessel, and a coating on the outside of said bottom wall to facilitate removal of food deposits therefrom.

2. The combination of claim 1 wherein said sheathed heating element comprises a heating element of circular shape brazed to said bottom wall, said radiation shield comprising a shallow sheet metal pan having a flat central portion and upstanding peripheral side walls which engage said bottom wall of said vessel outside of said heating element forming an enclosure for said element.

3. The combination of claim 1 wherein said vessel is formed of an aluminum alloy, said coating being a porcelain enamel which increases the heat radiation from said bottom wall, said manually operable assembly means including a threaded stud fixed to said bottom wall and extending downwardly through said radiation shield, said shield having mounted thereon a knurled nut having a portion exposed for rotation manually below said shield and threaded into engagement with said stud.

4. The combination of claim 1 wherein said combined handle and feet members are formed of molded plastic and are connected together by an integrally molded web which extends beneath said shield and retains said shield against said bottom wall of said vessel.

5. The combination of claim 4 wherein said vessel is provided with a threaded stud extending downwardly from said bottom wall, a manually operable knurled nut rotatably supported by said web and rotatable into threaded engagement with said stud to retain said shield and said combined handle and feet members assembled to said vessel.

6. The combination of claim 1 wherein said vessel is provided with threaded studs extending outwardly from opposite side walls, said manually operable means comprising manually operable nuts received on said studs for engagement with said shield or said combined handle and feet members, a locating stud extending downwardly from said bottom wall into engagement with said shield.

7. The combination of claim 6 wherein said shield includes portions extending upwardly parallel to the sidewalls supporting said threaded studs, said portions having slots within which said studs are received.

8. The combination of claim 6 wherein said combined handle and feet members are formed with portions engaging said sidewalls supporting said threaded studs, said last mentioned portions being formed with slots to receive said studs whereby said nuts clamp said portions of said combined handle and feet members against said sidewalls to retain said shield and said members assembled to said vessel.

9. An immersible electric frying pan comprising a vessel of heat conducting material having side walls and a bottom wall with a sheathed electric heating element supported on said bottom wall in good heat conducting relationship with said bottom wall, a radiation shield readily detachably connected to said vessel and positioned below said bottom wall to shield radiation from said bottom wall to a supporting surface, combined handle and feet members on opposite sides of said vessel and engaging opposite edges of said shield, said combined handle and feet members being formed of heat insulating material, manually operable assembly means for retaining said shield and said members secured to said vessel, and a coating on the outside of said bottom wall to facilitate removal of food deposits therefrom, said heating element being of circular shape and brazed to said bottom wall, said radiation shield comprising a shallow sheet metal pan having a flat central portion and upstanding peripheral side walls which engage said bottom wall of said vessel outside of said heating element forming an enclosure for said element, said peripheral sidewalls being formed with at least one opening through which said heating element extends for connection with a source of power, said combined feet and handle members having support portions which extend into said enclosure through openings in said peripheral sidewalls, assembly means attaching the support portions within said enclosure to said shield.

10. An immersible electric frying pan comprising a vessel of heat conducting material having side walls and a bottom wall with a sheathed electric heating element supported on said bottom wall in good heat conducting relationship with said bottom wall, a radiation shield readily detachably connected to said vessel and positioned below said bottom wall to shield radiation from said bottom wall to a supporting surface, combined handle and feet members on opposite sides of said vessel and engaging opposite edges of said shield, said combined handle and feet members being formed of heat insulating material, manually operable assembly means for retaining said shield and said members secured to said vessel, and a coating on the outside of said bottom wall to facilitate removal of food deposits therefrom, said vessel being formed of an aluminum alloy, said coating being a porcelain enamel which increases the heat radiation from said bottom wall, said manually operable assembly means including a threaded stud fixed to said bottom wall and extending downwardly through said radiation shield, said shield having mounted thereon a knurled nut having a portion exposed for rotation manually below said shield and threaded into engagement with said stud, said combined handle and feet members each having handle portions which extend parallel to and spaced from the opposed side walls of said vessel, said handle portions supporting said vessel out of contact with a supporting surface when said frypan is inverted thereon, said knurled nut being engageable with said stud to commence threaded engagement when said vessel and said handle portion are resting inverted on a supporting surface.

11. An electric frypan comprising a shallow rectangular aluminum alloy vessel having side walls and a bottom wall, a sheathed electric heating element fixed to said bottom wall in good heat exchange relation therewith, said element being generally circular and having parallel ends which extend to the edge of said bottom wall and support insulated terminals thereon, a probe type temperature control having an elongated probe and electrical terminal connectors, means in good heat exchange relationship with said bottom wall between said parallel ends forming a passageway within which said elongated probe is received when said terminal connectors engage said terminals, a terminal cover secured to said bottom wall enclosing said terminals and providing an opening to receive said probe control, a radiation shield comprising a generally pan shaped member having a flat central portion and upstanding side walls, a threaded stud extending downwardly from the center of said bottom wall, a knurled nut rotatably supported in the center of said flat central portion and having a large knurled manually actuable portion exposed below said shield, said nut threadedly engaging said stud to retain said shield assembled to said vessel, combined handle and feet members of heat insulating material having transversely extending handle portions at the ends of which column portions extend downwardly terminating in foot members, support portions extending inwardly from each of said column portions for engagement with said bottom wall to support said vessel in closely spaced relation to a supporting surface.

12. The combination of claim 11 wherein said shield is fixed to said support portions of said vessel so that said shield and combined handle and feet members are removable as an assembly from said vessel.

13. The combination of claim 12 wherein said bottom wall of said vessel is coated with a porcelain enamel to facilitate cleaning, said shield enclosing the generally circular portion of said heating element and having an opening in said side walls through which said parallel ends and said means forming a passageway extend.

14. The combination of claim 11 wherein said shield overlies said support portions of said combined handle and leg members and is provided with means engaging said support portions to retain said combined handle and leg members assembled to said frypan.

* * * * *